(12) United States Patent
Rosen

(10) Patent No.: US 6,619,555 B2
(45) Date of Patent: Sep. 16, 2003

(54) THERMOSTAT SYSTEM COMMUNICATING WITH A REMOTE CORRESPONDENT FOR RECEIVING AND DISPLAYING DIVERSE INFORMATION

(76) Inventor: Howard B. Rosen, 1 Lyncroft Road, Hampstead Qc. (CA), H3X 3E3

( * ) Notice: Subject to any disclaimer, the term of this patent is extended or adjusted under 35 U.S.C. 154(b) by 0 days.

(21) Appl. No.: 10/075,886

(22) Filed: Feb. 13, 2002

(65) Prior Publication Data

US 2003/0150926 A1 Aug. 14, 2003

(51) Int. Cl.[7] .......................... G05D 23/00; F23N 5/20
(52) U.S. Cl. ..................................... 236/46 R; 236/51
(58) Field of Search .................. 236/46 R, 51, 236/94; 165/238

(56) References Cited

U.S. PATENT DOCUMENTS

| | | | |
|---|---|---|---|
| 5,361,982 A | * 11/1994 | Liebl et al. | 236/46 R |
| 5,568,385 A | 10/1996 | Shelton | 364/420 |
| 5,896,443 A | 4/1999 | Dichter | 379/93.08 |
| 5,924,486 A | * 7/1999 | Ehlers et al. | 165/238 |
| 5,999,882 A | 12/1999 | Simpson et al. | 702/3 |
| 6,161,133 A | 12/2000 | Kikinis | 709/220 |
| 6,166,342 A | 12/2000 | Chou | 200/344 |
| 6,182,113 B1 | 1/2001 | Narayunuswami | 709/203 |
| 6,264,110 B1 | * 7/2001 | Proffitt et al. | 236/94 X |
| 6,336,142 B1 | 1/2002 | Kato et al. | 709/227 |
| 6,454,177 B1 | * 9/2002 | Sasao et al. | 236/46 R |

* cited by examiner

*Primary Examiner*—William Wayner
(74) *Attorney, Agent, or Firm*—David T. Brachen

(57) ABSTRACT

A thermostat system includes a temperature sensor, an LCD for selectively displaying an alphanumeric message and a processor having a memory for storing program and data information. In one embodiment, the data includes a table storing key terms on a predetermined subject. A communications interface connects the processor and a remote correspondent which is a source of current information. Periodically, communications is established with the remote correspondent to read the current information and parse the current information against the stored key terms. If a match is found, the current information is further searched for a value associated with the matched key term in order to display an alphanumeric message which shows a first message component representative of the connotation of the matched key term and a second message component representative of the associated value. In a variant embodiment, the remote correspondent provides a service periodically sending predetermined information for display on the LCD. In another variant embodiment, the thermostat system can use current information received from the first remote correspondent to send directive information to suitably change the temperature (or other parameter) set point at a second remote site.

20 Claims, 6 Drawing Sheets

A thermostat system according to the invention includes: a temperature sensor for providing an electrical signal indicative of the temperature of a conditioned space in which the temperature sensor is situated; a liquid crystal display (LCD) for selectively displaying an alphanumeric message; and a processor having: a CPU, real time clock and a memory for storing program and data information. In one embodiment, the data includes a table storing key terms on a predetermined subject (e.g., current and predicted weather conditions in a given locale). A communications interface is adapted to establish bi-directional communications (via the Internet or some other suitable facility) between the processor and a remote correspondent which is a source of current information on the predetermined subject. Periodically, or on demand if provided for, a program stored in the memory causes the CPU to selectively: establish communications with the remote correspondent, read the current information and parse the current information against the stored key terms. If a match is found, the current information is further searched for at least one value associated with the matched key term; and if at least one such value is found, an alphanumeric message is displayed on the LCD to show a first message component representative of the connotation of the matched key term and a second message component representative of the associated value.

THERMOSTAT SYSTEM COMMUNICATING WITH A REMOTE CORRESPONDENT FOR RECEIVING AND DISPLAYING DIVERSE INFORMATION

FIELD OF THE INVENTION

This invention relates to the art of thermostats and, more particularly, to a thermostat system incorporating a communication interface for receiving and displaying diverse information from a remote correspondent. In an extended version, this invention relates to a thermostat system for receiving and displaying information from a first remote correspondent and selectively issuing an information/directive message to a second remote correspondent.

BACKGROUND OF THE INVENTION

Thermostats have been used for many years as a temperature sensitive switch which controls heating and/or cooling equipment for conditioning a space in which the thermostat, or a temperature sensor connected to the thermostat, is placed. In the well known manner, a simple thermostat can be adjusted to establish a temperature set point such that, when the temperature in the conditioned space reaches the set point, the thermostat interacts with the heating and/or cooling equipment to take suitable action to heat or cool the conditioned space as may be appropriate for the season.

Modern thermostat systems, which take advantage of the ongoing rapid advances in electronic technology and circuit integration, have many features which provide more precise supervision of the heating and/or cooling equipment to achieve more economical and more comfortable management of the temperature of a conditioned space. Many modern thermostat systems include a real time clock, a memory and a data processor to run a process control program stored in the memory to accurately measure the temperature of a temperature sensor disposed in the conditioned space and to send control signals to the heating and/or cooling equipment to closely control the temperature of the conditioned space. Modern thermostat systems permit anticipating and minimizing hysterisis or overshoot of the temperature in the conditioned space. In addition, the program can specify different set points at different times of the day and week and may also include a "vacation" mode which employs different set points when the conditioned space is not occupied for an extended period.

Many modern thermostat systems are programmable by a user. Typically, prior art programmable thermostat system employ a tactile touch pad with various fixed position buttons to be touched in a precise sequence to program set points (which may vary with the day of the week) for programmable time periods which may include a vacation mode. The programming sequence may be followed on a separate display, typically a liquid crystal display.

Other types of modern thermostat systems may limit, or even make no provision for, user programming. For example, thermostats distributed throughout a large commercial establishment may be programmable only by authorized persons employing special tools or may even have their programs permanently set at the time of manufacturer or installation. These non-programmable thermostat systems do not have a user accessible touch pad (or have no touch pad at all), but may incorporate a user readable display.

The present invention finds use in both programmable and non-programmable thermostat systems which operate under control of a processor.

SUMMARY OF THE INVENTION

In a variant embodiment, the remote correspondent provides a service sending, periodically or on demand, predetermined information for display on the LCD. In this variant, there is no parsing against locally stored key terms. In another variant embodiment, the thermostat system can use current weather information received from the first remote correspondent to determine and act if the received information is such that a second remote correspondent interfacing with a remotely controllable thermostat system should be contacted, and send directive information to suitably change the temperature (or other parameter) set point at the second remote site.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
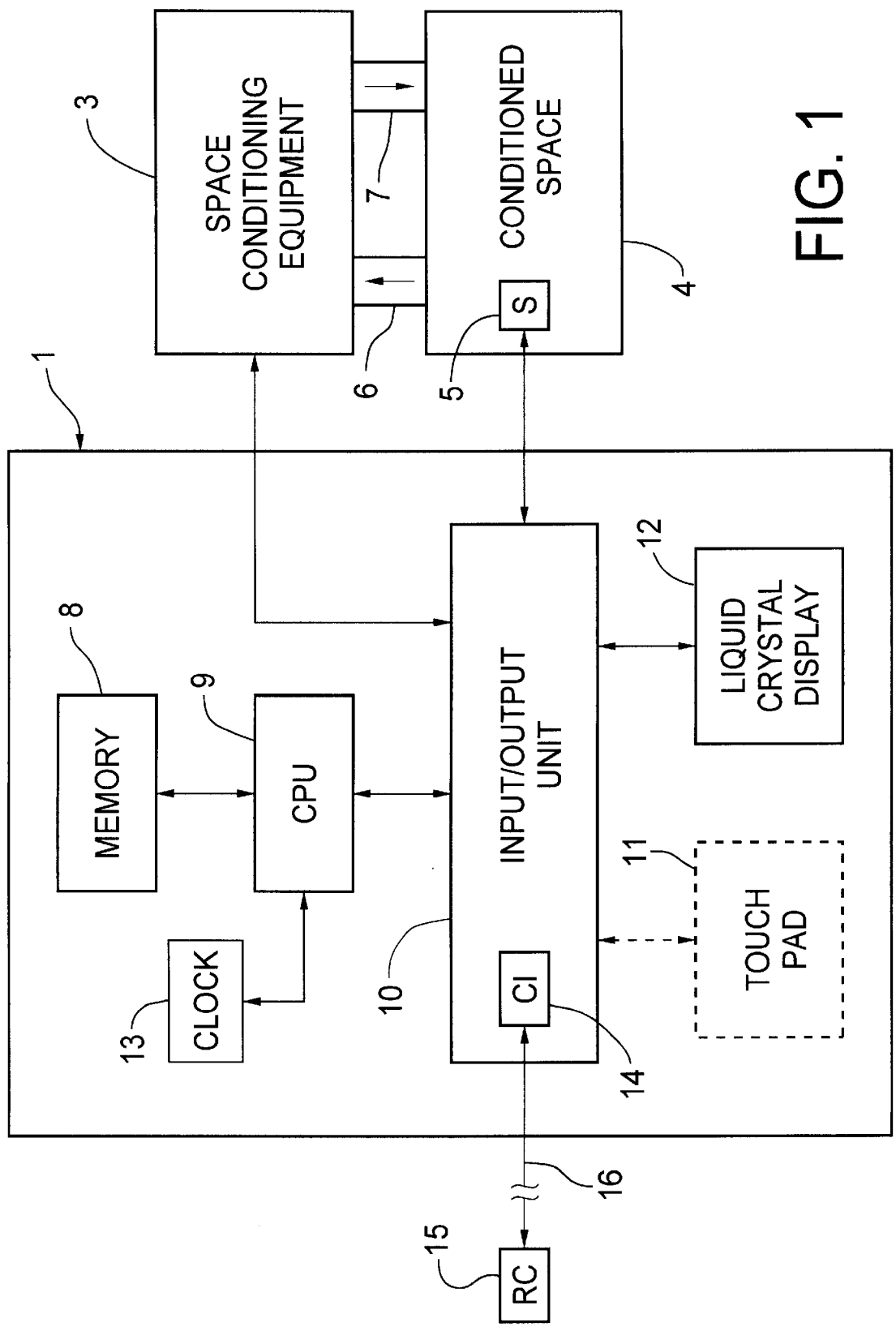
FIG. 1 is a block diagram of a first embodiment of a space conditioning system incorporating a thermostat system employing the present invention.

Referring first to FIG. 1, a thermostat system includes a processor 1 and a temperature sensor 5 which is disposed in a conditioned space 4. The processor 1 and the sensor 5 may be situated in a common housing (not shown) or separated, all as very well known in the art. The common housing is usually, but not necessarily, placed in the conditioned space 4. Thus, those skilled in the art will understand that the block diagram of FIG. 1 is very general in order to best explain the invention.

The processor 1 includes a central processing unit (CPU) 9 in communication with a memory 8 which stores data and program information and also, via an input/output unit (I/O unit) 10, an optional touch pad 11 and a liquid crystal display (LCD) 12. The liquid crystal display may optionally be backlit by any suitable means (not shown). The memory 8 may include a read-only part which is factory-programmed and a random-access part which stores data subject to change during operation. A settable real time clock 13 is used to keep time in the thermostat system to facilitate diverse operations, such as different temperature set points (desired temperatures), during different periods of the day cycle. The thermostat system may be suitably powered by a battery (not shown) and/or from equipment to which is connected. The I/O unit includes a communications interface 14 for coordinating communications between the CPU 9 and a remote correspondent 15. The communications interface 14 may be, for example, a conventional serial port.

Thus, in the usual manner during normal operation, the temperature sensor 5 sends an electrical signal (e.g., if the sensor 5 is a simple thermistor, a resistance value; several types of temperature sensors are widely used) representative of the temperature within the conditioned space 4 which the processor can compare against a previously entered set point to determine if control signals need to be sent to the space conditioning equipment 3. For example, if the temperature in the conditioned space 4 is found to be too low when operation is in the heating mode, the processor 1 signals the space conditioning equipment 3 circulate, through ducts 6, 7, air from/to the conditioned space 4 which is heated by the space conditioning equipment before return to the conditioned space. This heating phase continues until the sensor 5 indicates that the space is now too hot (or approaching too hot) with reference to the set point such that the processor 1 sends signal(s) to the space conditioning equipment 3 to cease the heating function, all as very well known in the art. In a cooling mode, a counterpart procedure is followed. Those skilled in the art will understand that the control process typically includes such refinements as anticipation, hysterisis accommodation, fan control, etc. which are acknowledged, but are not directly relevant to the invention.

It may be noted that integrated circuit chips including all the processor components with all the necessary interface conditioning circuits are available off-the-shelf and are under constant refinement for increased power. The subject invention only requires the capabilities of such a processor, and off-the-shelf integrated circuit processor chips may be used to advantage in the subject thermostat system.

Figure 5:
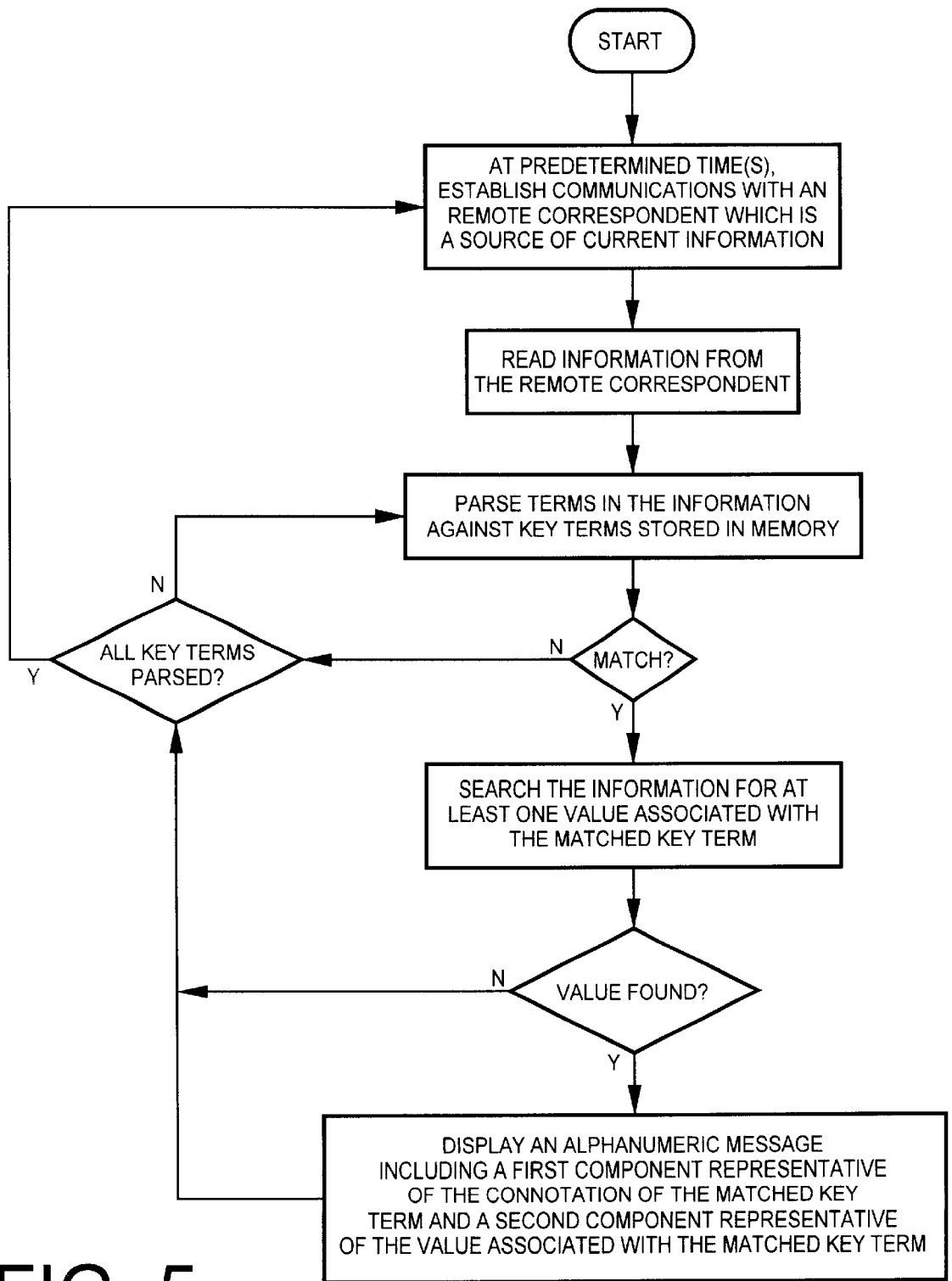
FIG. 5 is a high level process flow chart describing the operation of the invention in a first embodiment.

Consider now a first embodiment of the invention. Referring to FIG. 5 as well as FIG. 1, there is stored in the memory 8 (typically, in ASCII format) a series of key terms pertaining to a subject of interest such as the local weather. Exemplary key terms for this subject may be "temperature", "relative humidity", "high", "low", "barometric pressure", etc. The key terms may be stored in the memory during the manufacturing process of the thermostat system or, as will be described below, by user entry using the touchpad 11 and LCD 12.

At one or more predetermined times of day (and/or on-demand if provided for in the operating program) which have been previously stored in the memory 8 and established by the clock 13, the CPU 9 starts the process shown in FIG. 5 by issuing signals to the I/O unit 10 to cause the communications interface 14 to establish communications, via link 16, with a remote correspondent 15. The remote correspondent 15 has a known data communications "address" and, in the example, is a source of current information, such as local weather. Such local current weather information sources are widely available and are routinely accessed by, for example, using the Internet.

When the current local weather information is transmitted from the remote correspondent 15 via link 16 to the communications interface 14 and thence to the CPU 9, the CPU parses the information against the key terms stored in memory 8 to determine if there is a match. This is easily achieved because the source code (e.g., HTML if the communication is via the Internet) of the information will typically also be in ASCII format. If the CPU 9 senses a match, the just-received information is searched for the presence of at least one "value" associated with the matched key term. If such a value is found and under control of the CPU 9, a first alphanumeric message component representative of the connotation of the matched key term and a second alphanumeric message component representative of the value associated with the key term are displayed on the LCD 12.

If no value for the present matched term is found, but more key terms in the present set are yet to be compared to information just received from the remote correspondent 15, the same process is repeated until all the key terms in the present set have been parsed and alphanumeric messages, if generated, have been sent to the LCD 12. The immediate session then ends.

As an example, assume that Montreal weather is of interest to an occupant of a conditioned space in the Montreal area which uses the subject thermostat system and that "temperature", "high" and "low" are the key terms for the subject of local weather stored in the memory 8. Periodically, as determined by times stored in the memory 8, the CPU 9 issues signals to access the remote correspondent 15 (a site providing local Montreal weather in the example) and download the current weather information as a data stream. If the CPU finds, by examining and processing the data stream, that the term "temperature" has been received, it looks for the next characters in the data stream which can be a value associated with "temperature"; e.g., it may quickly find "+18° C.". With this coupling established, the CPU may access the memory 8 to read the prestored alphanumeric message component "Current Montreal Temperature:" and then concatenate, as a second alphanumeric message component, "18 C" and then send the complete message to the LCD 12 which displays: "CURRENT MONTREAL TEMPERATURE: 18° C.".

In a similar manner, if the key term "high" and an associated value are sensed, the exemplary message "MONTREAL HIGH TODAY: 26 C." may be displayed; and if the key term "low" and an associated value are sensed, the exemplary message "MONTREAL LOW TODAY: 9 C." may be displayed.

While an obvious application for using the invention is acquiring and displaying current weather information, other types of current information may be obtained and displayed in a like manner. For example, current stock quotations for stock indexes and individual stocks, mutual funds and the like can be automatically acquired, displayed and periodically updated by suitably programming the processor 1 with the address of a site which maintains such information current along with the desired key terms which may, in this example, be NYSE, etc. stock symbols. Thus, the "value" term would be the current stock quote. As an example, if the key term "FMAGX" is matched and an associated value of 102.75 is also found, the alphanumeric message "CURRENT QUOTE FOR MAGELLAN: 102.75" is generated and displayed. To closely track one or more stocks or funds, the remote correspondent can be accessed as often as desired to "refresh" the alphanumeric message showing the current quote. A wide variety of types of information may be programmed, accessed and displayed in a like manner.

Figure 6:
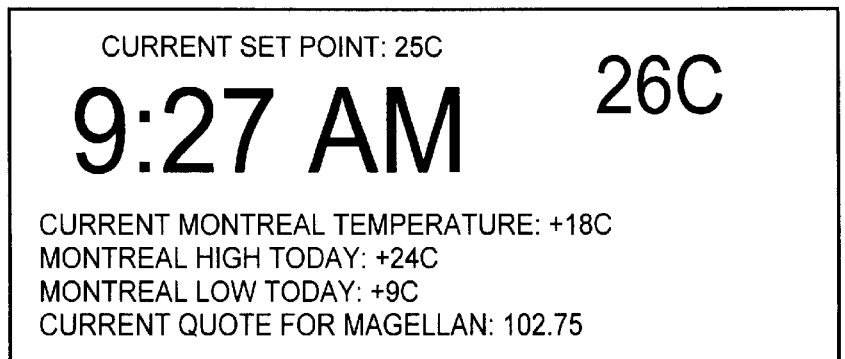
FIG. 6 is a pictorial of an exemplary display illustrating information presented to a user by the use of the invention.

It will be understood that the processor 1 can communicate successively or at different times with different remote correspondents. Thus, referring to FIG. 6, the current local weather information and the selected stock market information can be serially received and processed for display together in a manner which appears to be virtually simultaneous to a user. As previously noted, the overall display can be updated throughout the day at various times, as to each remote correspondent accessed, which have previously been entered in the memory 8.

If the thermostat system is programmable, the operating program installed during manufacture may provide for user entry following conventional instructions similar to those used in user-programming the climate control operation of the thermostat system. For example, assuming that the remote correspondent has an Internet address, the address may be entered using the touchpad 11 in any suitable manner as previously set up by a system programmer during software design. Then, various key terms the user wishes to employ with various remote correspondents having various addresses may be entered by a user.

Figure 7:
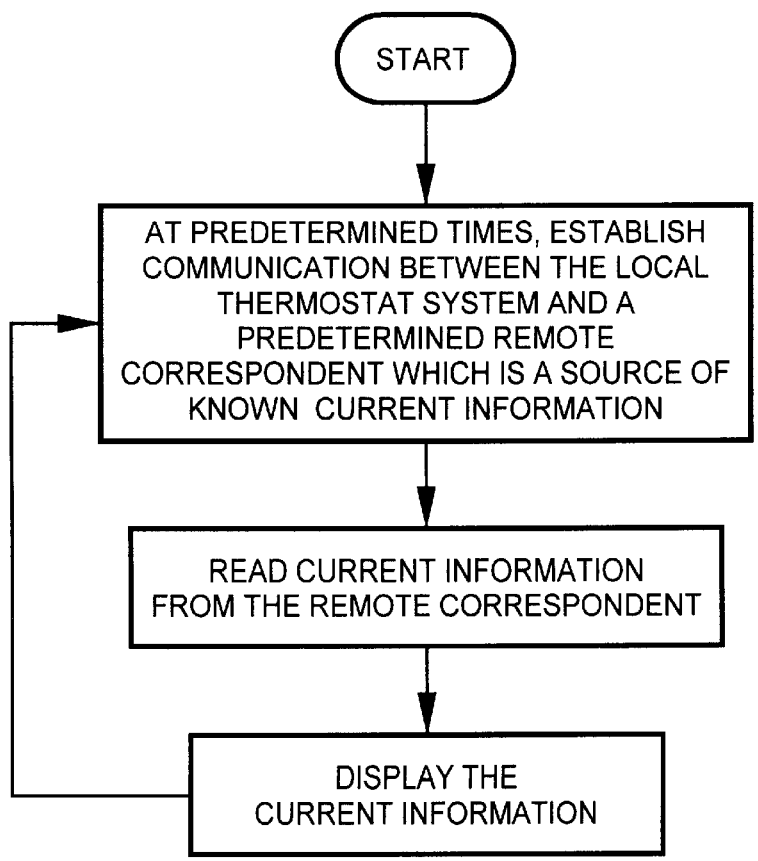
FIG. 7 is a high level flow chart describing the operation of the invention in a second embodiment.

As previously mentioned, the invention is not limited to use in programmable thermostat systems or even to thermostat systems in which correspondent addresses and key terms have previously been entered into memory 8. Still referring to FIG. 1 and also to FIG. 7, in a variant embodiment of the invention, a thermostat system communicates with a remote correspondent 15 which provides a customized service to the user of the thermostat system. In this embodiment of the invention, the user is a subscriber to the customized service in order to receive known current information on a predetermined schedule. At predetermined times (or on demand), data communications is established between the processor 1 and the remote correspondent 15 which, in this case, provides the customized service. The current information is downloaded and displayed. The resulting messages shown and periodically updated on the LCD 12 may be as shown in exemplary FIG. 6 if, for example, Montreal current temperature, daily high and low temperatures and the current quote for Magellan is what the user has subscribed to receive.

When the service is set up, the user and the business which provides the service via the remote correspondent 15 agree as to what current information (typically more than in the example) will be supplied on an agreed schedule. Depending upon the server-client relationship, either the processor 1 or the remote correspondent 15 may institute the current information transfer at the predetermined times or on demand.

Figure 2:
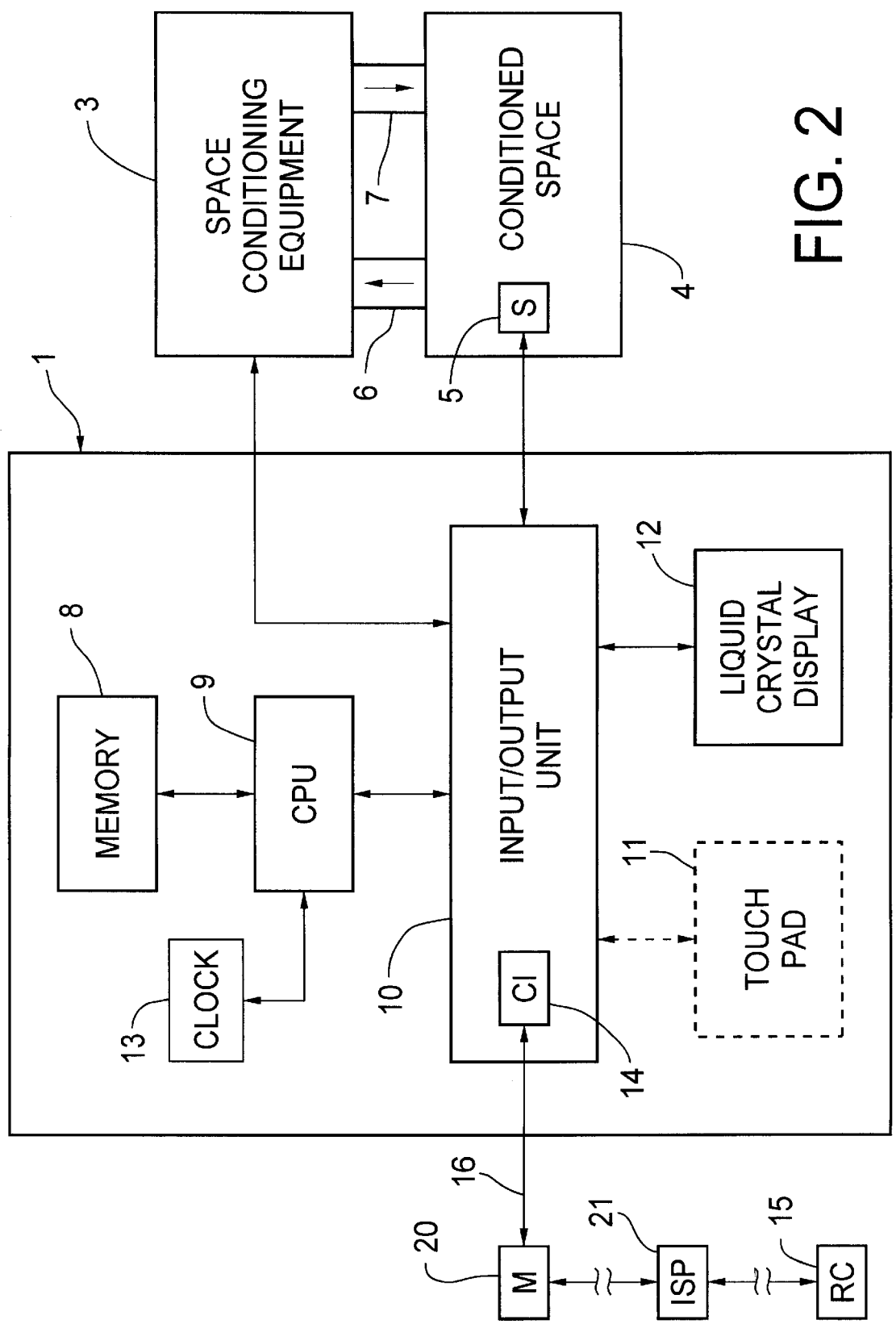
FIG. 2 is a block diagram of a second embodiment of a space conditioning system incorporating a thermostat system employing the present invention.

While the Internet is not the only facility which the subject thermostat system may use to communicate with a remote correspondent, it is, at the state-of-the-art the most readily widely available and easily accessible. Thus, FIG. 2 show a typical coupling in which the communications interface 14 sends/receives serial data to/from an external (to the thermostat system) modem 20 via serial link 16. The modem conventionally interfaces with an Internet Service Provider (ISP) 21 which completes the communications link to the remote correspondent in the well-known manner. The modem 20 may be dial-up, cable, DSL or any other type suitable for the communications environment in a given installation.

Figure 3:
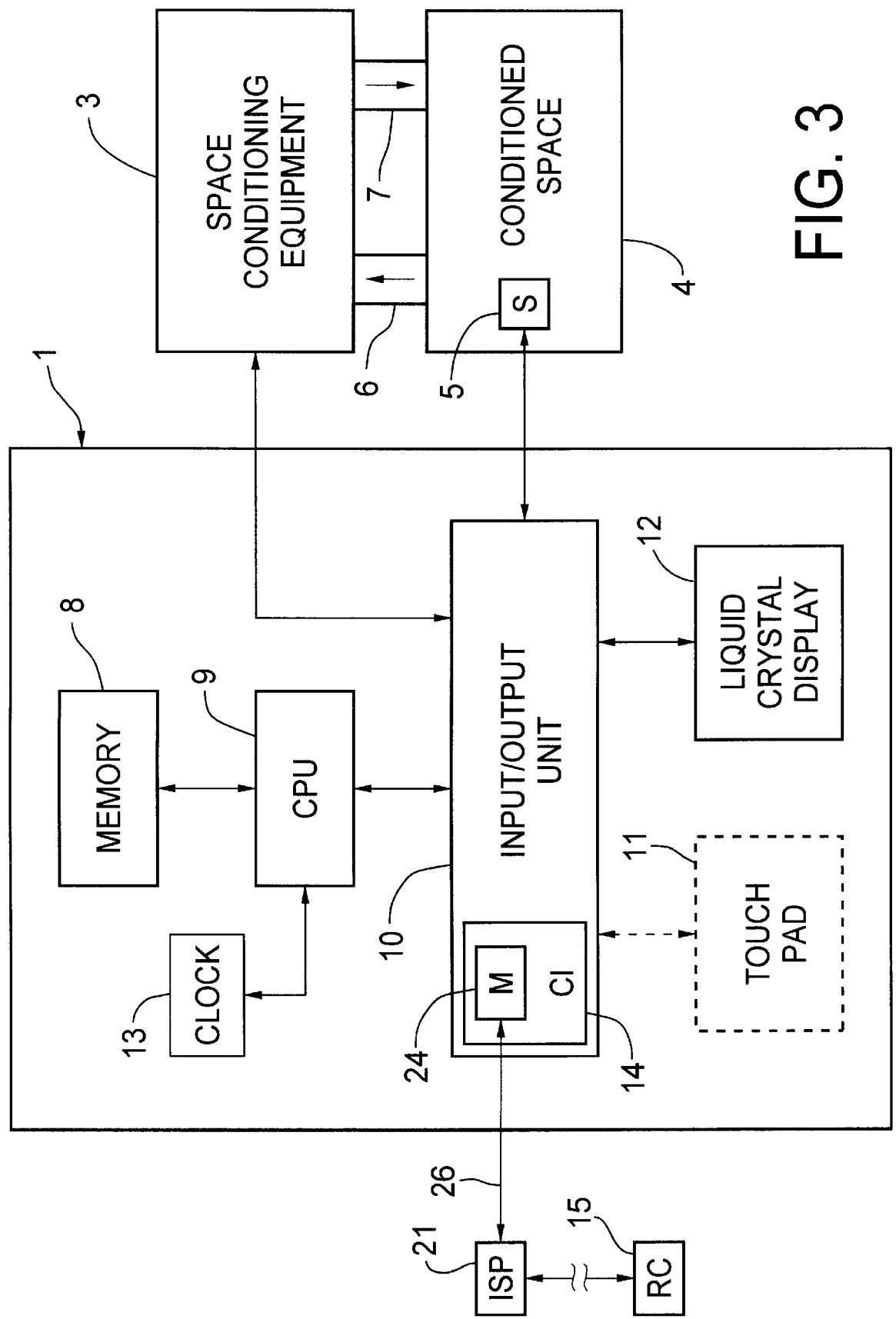
FIG. 3 is a block diagram of a third embodiment of a space conditioning system incorporating a thermostat system employing the present invention.

At the state-of-the-art and as shown in FIG. 3, a modem 24 for communicating with the ISP 21 may be integrated into the communications interface 14 of the input/output unit 14 to eliminate the need for an external modem. Thus, when communications is established with the remote correspondent 15 according to a schedule or upon demand, the data transfer takes place via modem 24 and data link 26 as shown.

Figure 4:
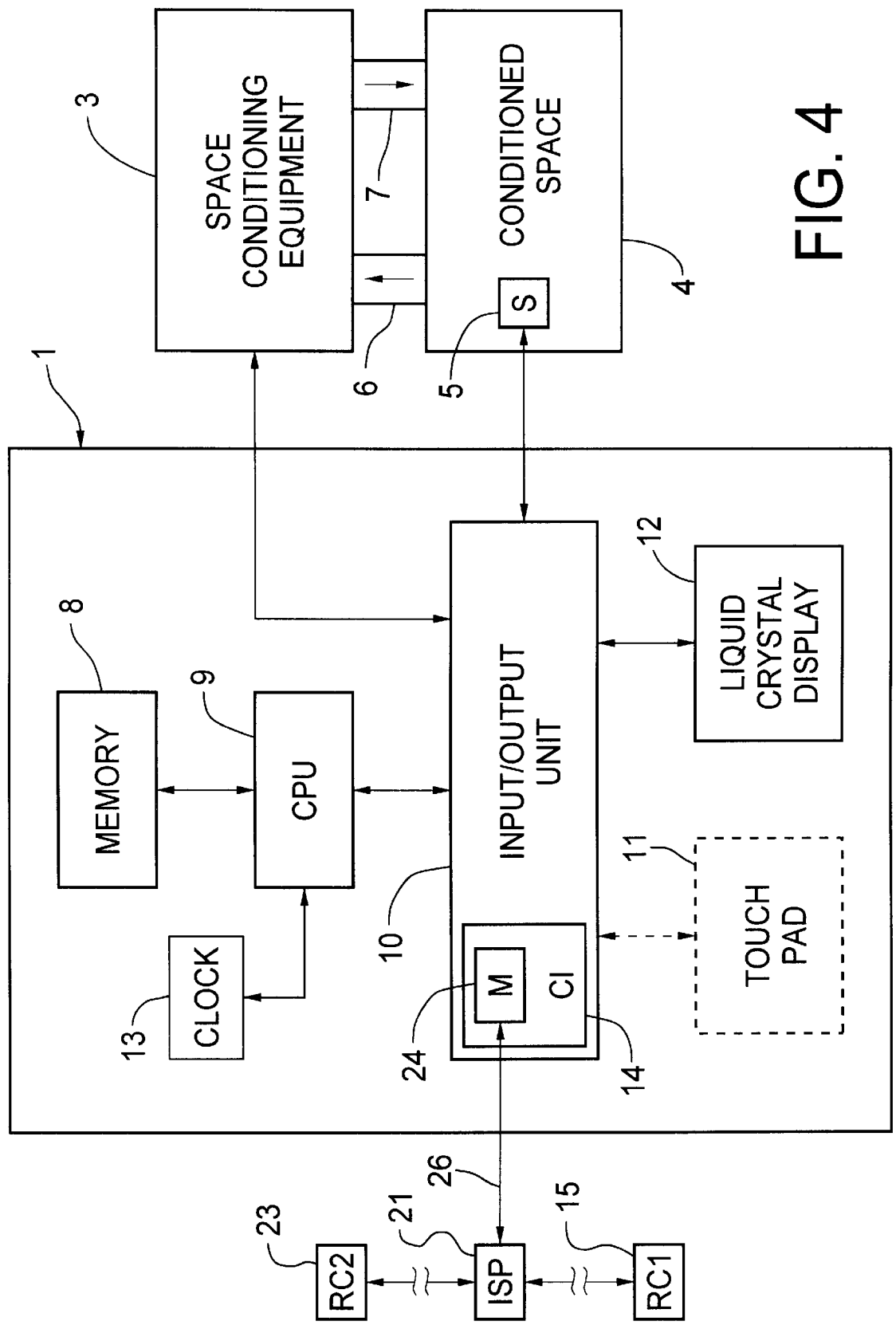
FIG. 4 is a block diagram of a first embodiment of a space conditioning system incorporating a thermostat system employing the present invention.

Attention is now directed to FIG. 4 which illustrates an optional extension of the subject thermostat system. It will be observed that the ISP 21 is not only in communication with the first remote correspondent 15, but also with a second remote correspondent 26. The second remote correspondent 23 may be another thermostat system (controlling another conditioned space (not shown) with other space conditioning equipment (not shown)) which can be remotely controlled. In this embodiment, data received from the first remote correspondent 15 as previously described may include specific information which can be interpreted by the processor 1 to require action at the site of the second remote correspondent 23. As an example, assume that the site of the second remote correspondent 23 is a temporarily unoccupied dwelling and that weather data received by the subject thermostat system indicates a predicted significantly low temperature predicted for the region of the site of the second remote correspondent 23. The processor 1 may determine, in response to this new weather information supplied by the first remote correspondent 15, that the heat should be turned on (or the set point raised) at the site of the second remote correspondent 23 in order to protect water pipes against freezing, warm the conditioned space controlled by the second remote correspondent in anticipation of its upcoming occupation, etc.

Those skilled in the art will appreciate that, in a large facility incorporating subdivisions in the conditioned space; each conditioned space having its own thermostat system, each of the thermostat systems may independently employ the invention as previously described.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A thermostat system for controlling space conditioning equipment comprising:

A) a temperature sensor for providing an electrical signal indicative of the temperature of a conditioned space in which the temperature sensor is situated;

B) a liquid crystal display for selectively displaying an alphanumeric message;

C) a processor, said processor including:
   1) a central processing unit;
   2) a real time clock;
   3) a memory coupled to said central processing unit for storing program and data information, said data including a table storing key terms on a predetermined subject; and
   4) an input/output unit including:
      a) a sensor input coupled to said temperature sensor for receiving said electrical signal therefrom;
      b) a control output coupled to the space conditioning equipment for issuing control signals thereto; and
      c) a communications interface adapted to establish bi-directional communications between said processor and a remote correspondent; and
D) a program stored in said memory for causing said central processing unit to selectively:
   1) direct said input/output unit to establish communications with a first remote correspondent which is a source of current information through said communications interface;
   2) read the current information from said external source;
   3) parse the current information against said key terms stored in said memory;
   4) if a match is found during step D)3), searching the current information for at least one value associated with the said matched key term; and
   5) if said at least one value associated with the matched key term is found during step D)4), displaying an alphanumeric message on said liquid crystal display, said alphanumeric message including:
      a) a first message component stored in said memory and representative of the connotation of said matched key term; and
      b) a second message component representative of said at least one value associated with the matched key term found during step D)4).

2. The thermostat system of claim 1 in which said communications interface includes a modem.

3. The thermostat system of claim 2 in which said key terms are stored in "ASCII" format and in which said current information is received in "HTML" format.

4. The thermostat system of claim 2 in which communications between said first remote correspondent and said communications interface is carried out via the Internet.

5. The thermostat system of claim 1 in which said communications interface is coupled to an external modem.

6. The thermostat system of claim 5 in which said key terms are stored in "ASCII" format and in which said current information is received in "HTML" format.

7. The thermostat system of claim 1 in which said key terms are stored in "ASCII" format and in which said current information is received in "HTML" format.

8. The thermostat system of claim 7, in which the source code of said current information is parsed against said key terms stored in said memory.

9. The thermostat system of claim 7 in which, said program further includes:
   A) alarm condition determination means adapted to detect an alarm condition included in said current information; and
   B) alarm condition alerting means to transmit an alarm message through said communications interface to a predetermined second remote correspondent.

10. The thermostat system of claim 1 in which the source code of said current information is parsed against said key terms stored in said memory.

11. The thermostat system of claim 1 in which, said program further includes:
   A) alarm condition determination means adapted to detect an alarm condition included in said current information; and
   B) alarm condition alerting means to transmit an alarm message through said communications interface to a predetermined second remote correspondent.

12. The thermostat system of claim 1 in which said communications interface includes a modem.

13. The thermostat system of claim 12 in which, said program further includes:
   A) alarm condition determination means adapted to detect an alarm condition included in said current information; and
   B) alarm condition alerting means to transmit an alarm message through said communications interface to a predetermined second remote correspondent.

14. The thermostat system of claim 12 in which communications between said first remote correspondent and said communications interface is carried out via the Internet.

15. The thermostat system of claim 1 in which said communications interface is coupled to an external modem.

16. The thermostat system of claim 15 in which, said program further includes:
   A) alarm condition determination means adapted to detect an alarm condition included in said current information; and
   B) alarm condition alerting means to transmit an alarm message through said communications interface to a predetermined second remote correspondent.

17. The thermostat system of claim 1 in which communications between said first remote correspondent and said communications interface is carried out via the Internet.

18. A thermostat system for controlling space conditioning equipment comprising:
   A) a temperature sensor for providing an electrical signal indicative of the temperature of a conditioned space in which the temperature sensor is situated;
   B) a liquid crystal display for selectively displaying an alphanumeric message;
   C) a processor, said processor including:
      1) a central processing unit;
      2) a real time clock;
      3) a memory coupled to said central processing unit for storing program and data information; and
      4) an input/output unit including:
         a) a sensor input coupled to said temperature sensor for receiving said electrical signal therefrom;
         b) a control output coupled to the space conditioning equipment for issuing control signals thereto; and
         c) a communications interface adapted to establish bi-directional communications between said processor and a first remote correspondent which is a source of current information; and
   D) means coupling said communications interface and said first remote correspondent; and
      a program stored in said memory for displaying messages received from said first remote correspondent, which received messages do not pertain to the operation of said thermostat system, on said liquid crystal display.

19. The thermostat system of claim 18 in which, said program further includes:

A) alarm condition determination means adapted to detect an alarm condition included in said current information; and B) alarm condition alerting means to transmit an alarm message through said communications interface to a predetermined second remote correspondent.

20. The thermostat system of claim 18 in which communications between said first remote correspondent and said communications interface is carried out via the Internet.

* * * * *